(12) United States Patent
Jaggers

(10) Patent No.: US 11,213,007 B2
(45) Date of Patent: Jan. 4, 2022

(54) KIT FOR ASSEMBLY OF A CAT HABITAT

(71) Applicant: Elizabeth Archer Jaggers, Worthington, OH (US)

(72) Inventor: Elizabeth Archer Jaggers, Worthington, OH (US)

(*) Notice: Subject to any disclaimer, the term of this patent is extended or adjusted under 35 U.S.C. 154(b) by 220 days.

(21) Appl. No.: 16/403,318

(22) Filed: May 3, 2019

(65) Prior Publication Data
US 2019/0335705 A1 Nov. 7, 2019

Related U.S. Application Data

(60) Provisional application No. 62/666,458, filed on May 3, 2018.

(51) Int. Cl.
| | | |
|---|---|---|
| *A01K 1/03* | (2006.01) | |
| *A01K 15/02* | (2006.01) | |
| *A01K 1/035* | (2006.01) | |

(52) U.S. Cl.
CPC .............. *A01K 1/033* (2013.01); *A01K 15/02* (2013.01); *A01K 1/035* (2013.01)

(58) Field of Classification Search
CPC ........ A01K 1/033; A01K 1/035; A01K 15/02; A01K 15/025; A01K 15/024; A01K 15/027; A01K 1/03; A01K 1/0245; A01K 1/0236
See application file for complete search history.

(56) References Cited

U.S. PATENT DOCUMENTS

| | | | |
|---|---|---|---|
| 3,742,908 A * | 7/1973 | Merino | A01K 1/03 119/455 |
| 4,989,546 A | 2/1991 | Cannaday | |
| 5,148,767 A | 9/1992 | Torchio | |
| 5,195,457 A | 3/1993 | Namanny | |
| 5,469,807 A | 11/1995 | Kosmaczeska | |
| 5,522,344 A | 6/1996 | Demurjian | |
| 5,577,465 A | 11/1996 | Cook | |
| 5,664,524 A * | 9/1997 | Piglia | A01K 1/03 119/452 |
| 5,809,933 A * | 9/1998 | Conwell, III | A01K 15/02 119/28.5 |
| 5,890,455 A | 4/1999 | Donchey | |
| 6,401,663 B1 | 6/2002 | Meier, Jr. | |
| 6,470,829 B1 | 10/2002 | Spangler | |
| 6,886,495 B1 | 5/2005 | Madden | |
| 7,614,363 B2 | 11/2009 | Di Angelo | |
| 7,934,470 B1 * | 5/2011 | Barker | A01K 15/024 119/28.5 |
| 2006/0042558 A1 | 3/2006 | Stephens | |
| 2007/0163512 A1 * | 7/2007 | Di Angelo | A01K 15/025 119/484 |
| 2010/0101501 A1 * | 4/2010 | Mcpherson | A01K 1/033 119/436 |
| 2010/0175631 A1 | 7/2010 | Bennatt | |
| 2013/0068171 A1 * | 3/2013 | Lee | A01K 1/035 119/416 |
| 2014/0290586 A1 | 10/2014 | Kleuskens | |

* cited by examiner

*Primary Examiner* — Trinh T Nguyen
(74) *Attorney, Agent, or Firm* — Bryce D. Miracle

(57) ABSTRACT

In accordance with the invention, a kit for a cat habitat is provided which includes a customizable arrangement of tubular modules and destination modules and is adaptable to the exterior of a home. The cat habitat is configured to provide one or more interlinking cat navigable pathways providing ingress and egress to the interior of the home.

16 Claims, 12 Drawing Sheets

Assembly "A"

Assembly "B"

Detail "A"

Section A-A

Detail "B"

KIT FOR ASSEMBLY OF A CAT HABITAT

RELATED U.S. PROVISIONAL APPLICATION

This application is based upon and claims the priority filing date of the previously filed, U.S. Provisional patent application entitled "CAT HABITAT AND SYSTEM" filed May 3, 2018, Ser. No. 62/666,458, the entire disclosure of which is hereby incorporated herein by reference.

FIELD OF THE INVENTION

The present invention relates to the field of cat habitats, particularly with regard to a habitat provided in a kit which provides a customizable arrangement of tubular modules and destination modules.

BACKGROUND

The domestic cat is a small, typically furry, carnivorous mammal. They are often called house cats when kept as indoor pets or simply cats when there is no need to distinguish them from other felids and felines. They are often valued by humans for companionship and for their ability to hunt vermin. There are more than seventy cat breeds recognized by various cat registries and over half of U.S. household (41 million) own 94 million cats, 40% of which are allowed to roam free outdoors.

Cats are naturally creative and inquisitive creatures—always looking for ways to intrigue their instincts and entertain themselves. Some of these activities include the cat's natural instinct to prey upon and hunt small animals—much like their distant, wild relatives. Thus, cat's that are allowed to roam freely outside of the household are much more likely to practice and hone their hunting skills much to the disadvantage of local birds and other small animals. Cats are responsible for the extinction of at least thirty-three species of animals, twenty-three of which are birds. It is said that 1.4-3.7 billion birds are killed by free roaming cats annually in the contiguous United States. Therefore, posing a significant risk to current bird species and other small animals.

Moreover, it is known that 15% of free roaming outdoor cats (14 million) get lost each year, and 1 in 4 are never recovered. This is evidenced by the life expectancy of indoor cats at about seventeen years vs. the outdoor cat at only three to five years. Certain studies have suggested that the leading cause of cat mortality is from blunt force trauma—such as being hit by a vehicle or injury caused from a predator. Put simply, free roaming outdoor cats are at a heightened risk of injury from predators, vehicles, diseases, other cats, and human cruelty.

SUMMARY

In accordance with the invention, a kit for a cat habitat is provided which comprises a customizable arrangement of tubular modules and destination modules and is adaptable to the exterior of a home. The cat habitat is configured to provide one or more interlinking cat navigable pathways providing ingress and egress to the interior of the home. In a version of the application, the kit comprises: a) one or more tubular passageway modules for providing a segment of the cat navigable pathway, each tubular passageway module comprising: i) a cat walkway having a flat bottom with upward extending sides extending the length of the module, wherein the cat walkway is at least partially manufactured of wire mesh exposing the pathway to the outside airflow; ii) a roof having a curved cross-section extending the length of the module and attachably coupled to and between the upward extending sidewalls in order to fully enclose the pathway; and iii) a mosquito-proof screening providing a barrier along the length of the module sealing and shielding the pathway from exterior insects; b) destination module for providing an enclosed vertical pathway leading to an elevated vantage point, the destination module comprising: i) a base container having a floor, an upward extending sidewall, an open top defined by a perimeter, the wall having at least one access port configured to couple with the at least one tubular passageway module, the base container having a plurality of staggered platforms ensuing in height; ii) an overlook assembly for providing an elevated vantage point of the exterior environment, the overlook assembly operably positioned atop and sealing about the open top perimeter forming the destination module, the overlook assembly having a partial floor providing vertical access to the base container, a transparent side wall extending upward and about the perimeter of the overlook, and a contoured roof operably positioned atop the side wall forming the interior space and preventing rain and other elements from entering the destination module; and iii) a mosquito-proof screening providing a barrier about the overlook assembly, thereby sealing and shielding the interior space of the destination module from exterior insects.

In certain versions of the application, the kit may further comprise one or more yard supports for supporting one or more tubular passageway modules at a desired height, the yard supports comprising: opposing legs adapted to insert with a ground surface; a central support structure connecting the opposing legs and operably shaped in conjunction with the opposing legs to receive and cradle the cross-section of the one or more tubular passageways; each leg extending upward and terminating at an attachment socket having inwardly exposed channels, each channel configured to couple with and contain the upper perimeter of the opposing sides of the cat walkway and the roof, thereby providing a tight unitary constructive fit.

In yet other versions of the application, the kit may further comprise one or more connection modules for connecting two or more tubular passageways, providing a continuous pathway from one module to another.

In another certain version, the kit may further comprise a pet door access module for ingress and egress to the interior of the house through an exterior wall, the pet door access module comprising: an enclosed hinged door operably positioned at the exterior home wall; an exterior container for enclosing the hinged door having at least one port; and a flexible connection tube for connecting and providing a pathway between the exterior container port and a connection module or a tubular passageway.

In yet another version of the application, the kit may further comprise a window access module for ingress and egress to the interior of the house through an existing window structure, the window access module comprising: an exterior container substantially shaped and sized to correspond with the exterior of a window opening, the container comprising an open back, a window, and at least one port; and a flexible connection tube for connecting and providing a pathway between the port and a connection module or a tubular passageway.

In another optional version, the window access module may further comprise one or more ground supports for supporting the exterior container above the ground and at a sufficient height adjacent the window opening; and a seal which is operably positioned between the window opening and the open back of the exterior container.

These and other features of the present invention will become clear upon further review of the following specification and drawings.

BRIEF DESCRIPTION OF THE DRAWINGS

These and other features, aspects, and advantages of the present invention will become better understood with regard to the following description and accompanying figures where.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other versions that depart from these specific details. In other instances, detailed descriptions of well-known devices, circuits, and methods are omitted so as not to obscure the description of the present invention with unnecessary detail.

Moreover, the description is not to be taken in the limiting sense, but is made merely for the purpose illustrating the general principles of the invention, since the scope of the invention is best defined by the appended claims. Various inventive features are described below that can each be used independently of one another or in combination with other features.

Unless otherwise defined, all technical terms used herein have the same meaning as commonly understood by one of ordinary skill in the art to which the invention belongs. As used in the specification and the appended claims, the singular forms "a," "an," and "the" include plural references unless the context clearly dictates otherwise. Any reference to "or" herein is intended to encompass "and/or" unless otherwise stated.

With reference to the figures, a description of a version of the invention will be provided and is generally designated as numeral 100. Generally, the application is directed towards a kit for assembly of a cat habitat preferably positioned and adaptable to the exterior of a home—allowing the cat to be exposed to the outdoor environment yet contained within the confines of the habitat and the interior of the house. Moreover, the habitat kit 100 may provide interchangeable and customizable cat navigable pathways which allows pet owner to create and configure their own custom habitat layout which fits their existing home structure and/or pet needs.

Figure 5:
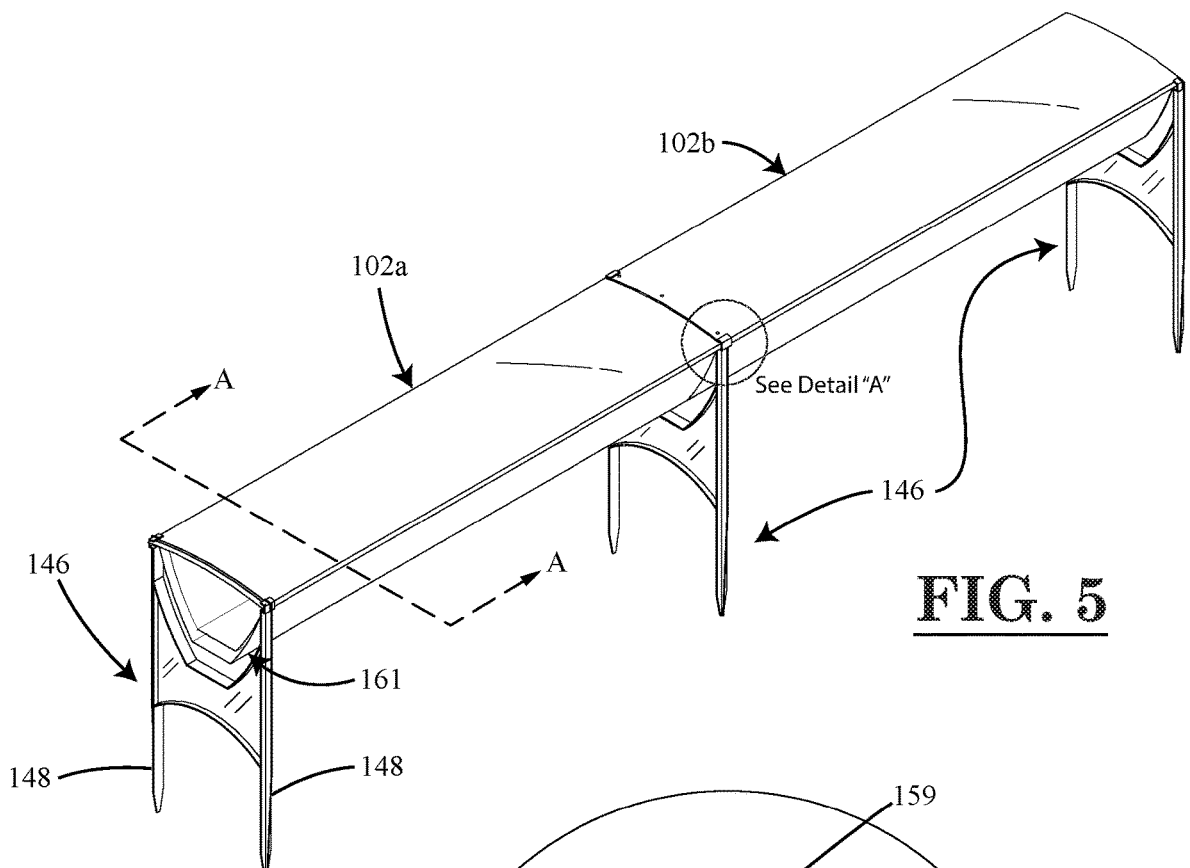
FIG. 5 is a perspective view of connected tubular passageway modules of the version shown in FIG. 1.
Figure 6:
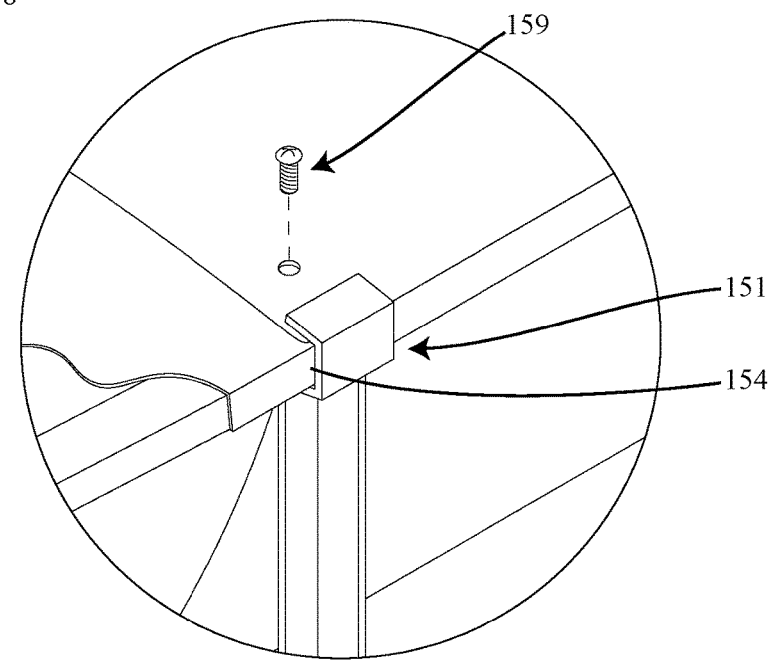
FIG. 6 is an up-close view taken from FIG. 5 Detail A showing the attachment socket connected to the tubular passageway modules at the seam.
Figure 7:
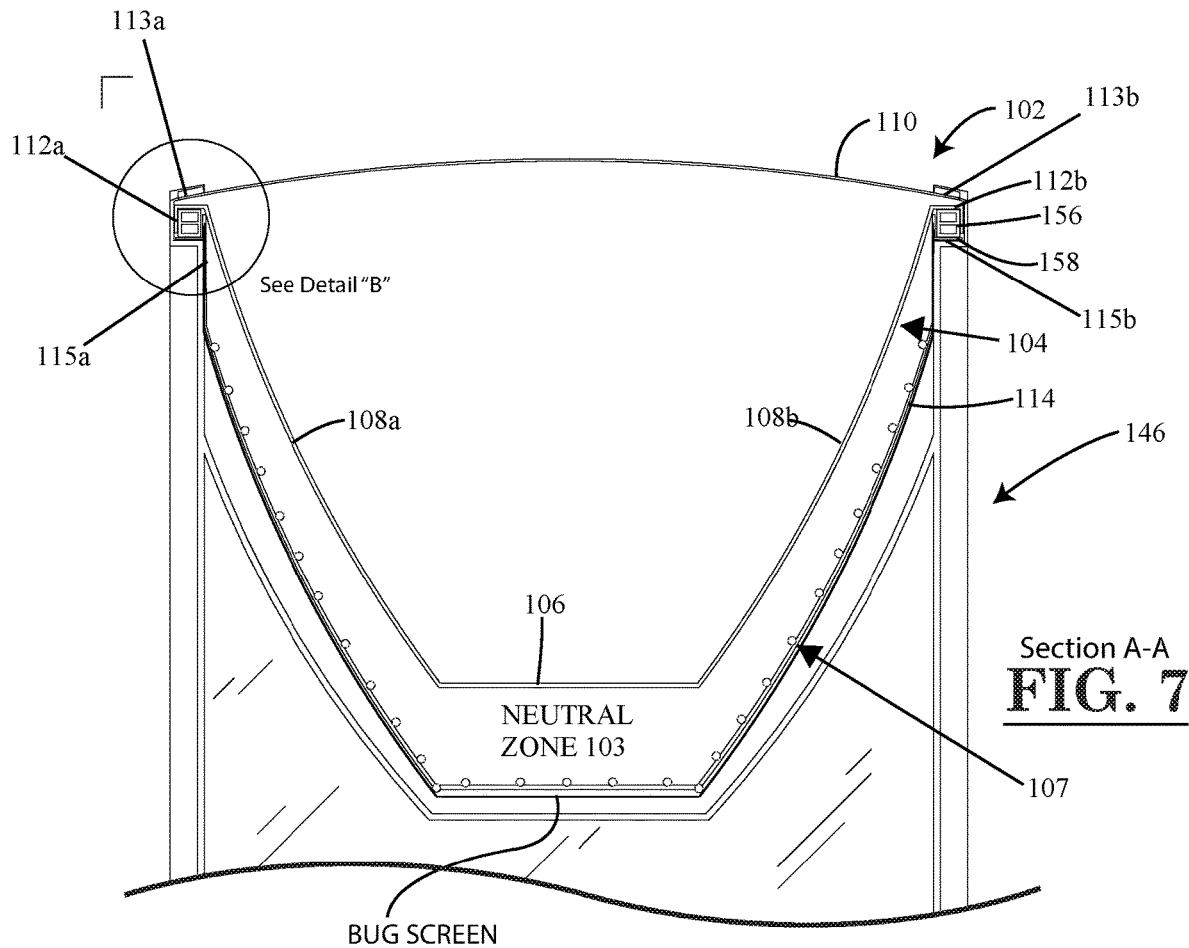
FIG. 7 is a cross-sectional view taken along the lines A-A of FIG. 6 showing the yard support cradling and the tubular passageway module of the version shown in FIG. 1.

Referring now to FIG. 1-FIG. 7, in a version of the application, the habitat kit 100 may comprise one or more tubular passageway modules 102 for providing a segment of the cat navigable pathway 80. Each tubular passageway module 102 generally including a cat walkway 104 having a bottom surface 106 or platform and upward extending sidewalls 108a, 108b extending the length of the tubular passageway module 102 forming a trough configuration (FIG. 7). The upward extending sidewalls 108a, 108b terminating at opposing respective longitudinal upper perimeters 112a, 112b. Ideally, the cat walkway 104 is at least partially manufactured of wire mesh caging, preferably at least the sidewalls 108, exposing the pathway 80 to the open-air outside environmental airflow. In the illustrated version (FIG. 3a), the bottom 106 is also made of a wire mesh; however, the bottom 106 or sidewalls 108 may be manufactured of other materials providing rigid or flexible qualities that provide a cat walkway.

The cat walkway 104 is covered by a roof 110 having a curved or contoured cross-section (FIG. 3a and FIG. 7) extending the length of the module 102 and attachably coupled to and extending between opposing longitudinal upper perimeters 112a, 112b of the upward extending sidewalls 108 which fully encloses the cat navigable pathway 80. In the illustrated version, the roof 110 terminates at each side at opposing side longitudinal perimeters 113a, 113b which operably connect with the respective opposing longitudinal upper perimeters 112a, 112b of the upper extending sidewalls 108a, 108b of the cat walkway 104 (See FIG. 8).

Referring to FIG. 7, a mosquito-proof screening 114 may be provided which generally provides a barrier along the length of the module 102 sealing and shielding the pathway 80 from exterior insects. In the illustrated version, the mosquito-proof screening 114 operably cloaks around the environmentally exposed cat walkway 104 comprised of mesh metal screening—sealing at each side of the module 102 at each sidewall 108 upper longitudinal perimeter 112 and with the roof 110. Ideally, the mosquito screening 114 is disposed at least a sufficient distance from the cat walkway 104 to form a neutral zone 103 therebetween to prevent the cat from damaging the mosquito screening 114. Preferably, the distance to form a neutral zone is between 0.5 and 1.5 inches.

Figure 4:
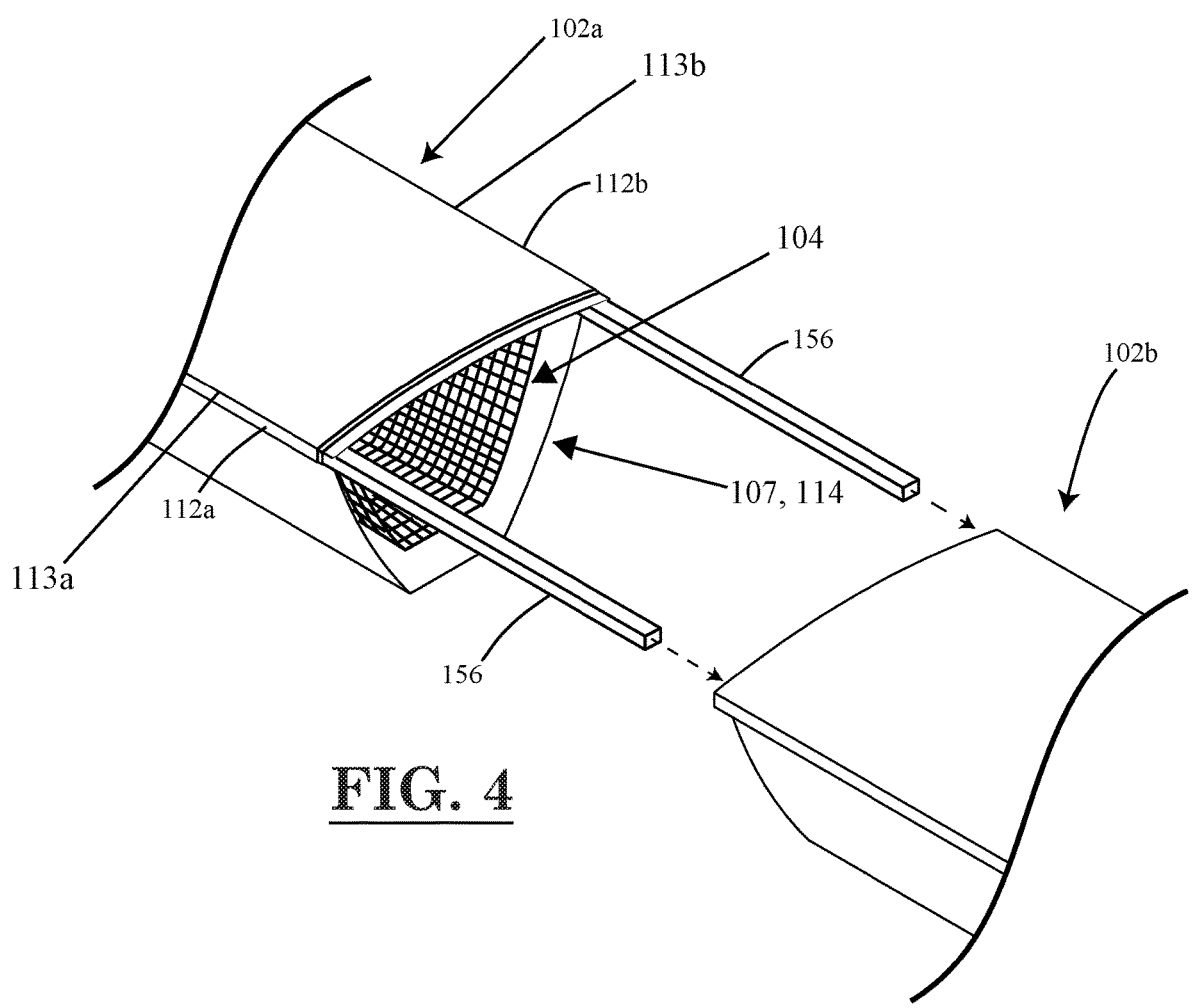
FIG. 4 is a view showing the connection between a first and second tubular passageway modules of the version shown in FIG. 1.

Referring to FIG. 4, a version of the application further comprises an exterior open-air safety barrier 107 for preventing wild animals from tampering with the cat walkway 104. The exterior open-air safety barrier 107 has opposing upper longitudinal perimeters 115a, 115b coinciding and connecting with the opposing upper longitudinal perimeters 112a, 112b of the cat walkway 104 and the opposing side longitudinal perimeters 113a, 113b of the roof 110. An exterior open-air safety barrier 107 is defined as any structure which allows airflow therethrough such as a cage or other mesh wire structure.

In the version, the mosquito screening 114 is coupled adjacent with the exterior open-air safety barrier 107 for shielding the pathway from exterior insects. Thus, the mosquito screening 114 envelopes the profile and shape of the exterior open-air safety barrier 107. Preferably, the exterior open-air safety barrier 107 is positioned exterior of the cat walkway 104 at least a distance from the cat walkway 104 to form a neutral zone 103 therebetween to prevent the cat from damaging the mosquito screening by way of batting or clawing, thereby preventing tears in the netting. Ideally, the depth of the neutral zone 103 is between 0.5 and 1.5 inches (See FIG. 7).

Referring now to FIG. 4-FIG. 8, in a version of the application, two or more tubular passageway modules 102 are connected at reciprocal ends by way of a pair of rigid linear connection rods 156 inserted into linear channels 158 extending the length of the tubular passageway modules 102 near the opposing longitudinal upper perimeters 112a, 112b.

Figure 8:
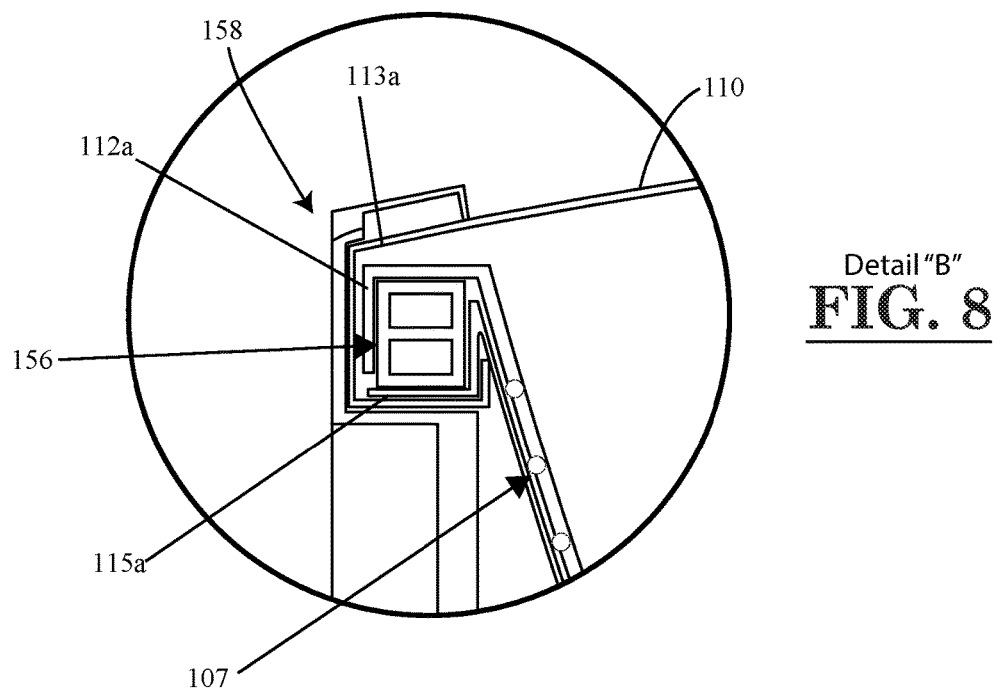
FIG. 8 is an up-close view taken from FIG. 7 Detail B showing the attachment socket connected to the tubular passageway module.

In the illustrated version, the tubular passageway modules 102 each have opposing linear channels 158 which extend the length of the longitudinal perimeters 112a, 112b which are adapted to receive and seat the pair of linear connection rods 156 (See FIG. 4 and FIG. 8). Thus, segments of the linear connection rods 156 are positioned within segments of the linear channels 158 of a first tubular passageway module 102a and opposing segments of the linear connection rods 156 are positioned within segments of the linear channels 158 of the second tubular passageway module 102b—providing a tight secure compression type fit which provides a continuous navigable pathway 80 between tubular passageway modules 102a, 102b. FIG. 6 shows that screws 159 can be utilized to strengthen the fit between tubular passageway modules 102a, 102b.

In a detailed version of the application and as best shown by FIG. 8, the opposing side longitudinal perimeters 113a, 113b of the roof 110, the opposing longitudinal upper perimeters 112a, 112b of the cat walkway 104, and the opposing upper longitudinal perimeters 115a, 115b of the exterior open-air safety barrier 107 longitudinally and collectively form integral opposing linear channels 158 extending the length of the tubular passageway module 102. The paired of linear connection rods 156 are fitted for insertion into the reciprocal linear channels 158 of two or more tubular passageway modules 102a, 102b providing an established compression fit.

In certain versions of the application, the habitat kit 100 may further comprise one or more yard supports 146 for supporting the one or more tubular passageway modules 102, ideally near the opposing ends at a desired height above the ground (See FIG. 5). A preferred version of the yard supports 146 may include opposing legs 148 adapted to insert with a ground surface, extending upward terminating at an attachment socket 151 (FIG. 6-FIG. 8) generally having inwardly mirrored and exposed channels 154. The upper portion of the yard support 146 forms a cradle 161 which is operably configured to receive the cross-sectional profile of the tubular passageway module (See FIG. 7 and FIG. 9). The yard supports 146 may vary in size and height.

In the version, each inwardly exposed channel 154 is configured to receive and couple with the opposing longitudinal upper perimeters 112a, 112b of each sidewall 108 of the cat walkway 104 and the roof 110 (FIG. 8). Thereby collectively providing a tight unitary constructive fit of the cat walkway 104, screening 114, and the roof 110 linearly together along the upper longitudinal perimeter 112 extending the length of the module 102.

Figure 9:
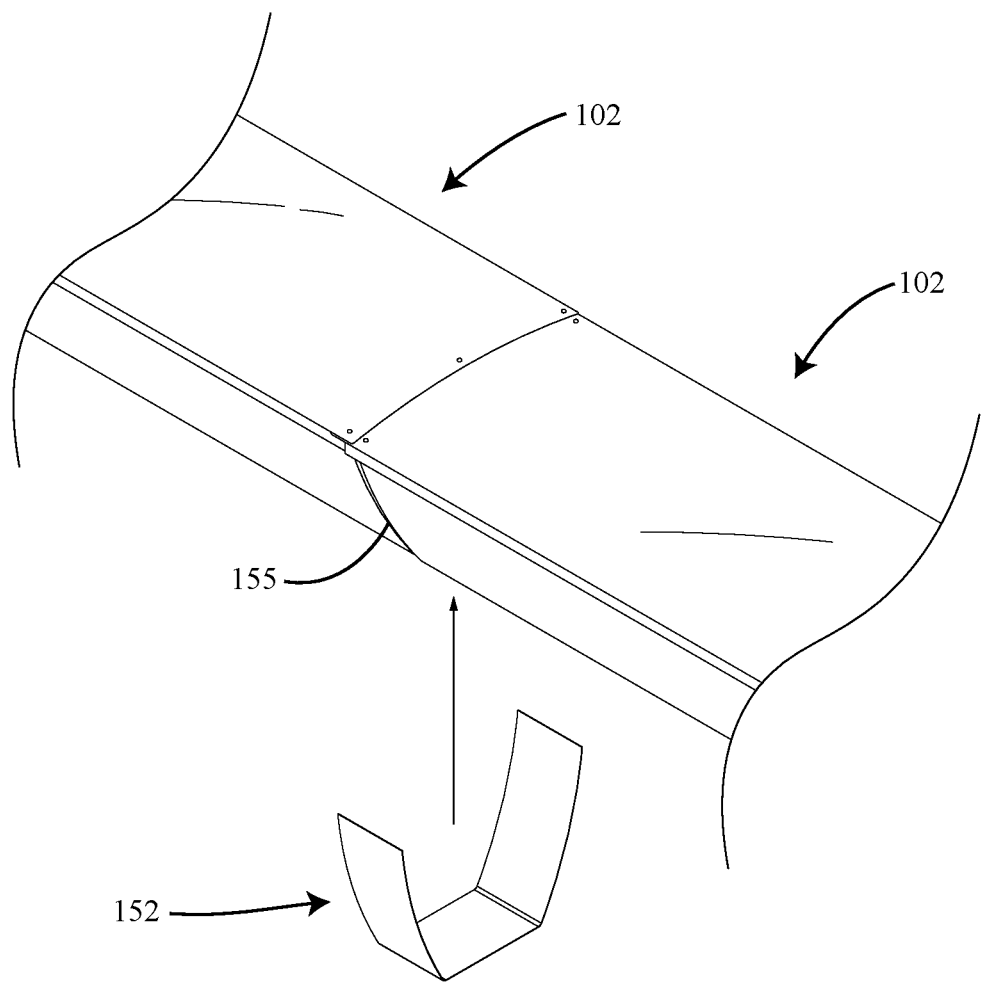
FIG. 9 is a disassembled perspective view of the yard support, the strap, and seam formed by two connected tubular passageway modules of the version shown in FIG. 1.
Figure 9:
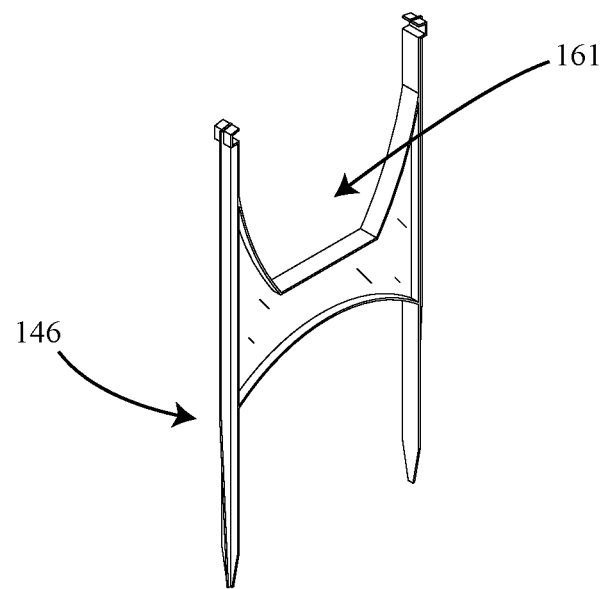

In a version of the application and as best shown in FIG. 9, the yard supports 146 may further comprise a metal strap 152 for covering the bottom seam 155 formed between two connected tubular passageway modules 102. The metal strap 152 is shaped to receive and cradle the cross-sectional profile of the cat walkway 104 and positioned between the central support structure 150.

Figure 3A:
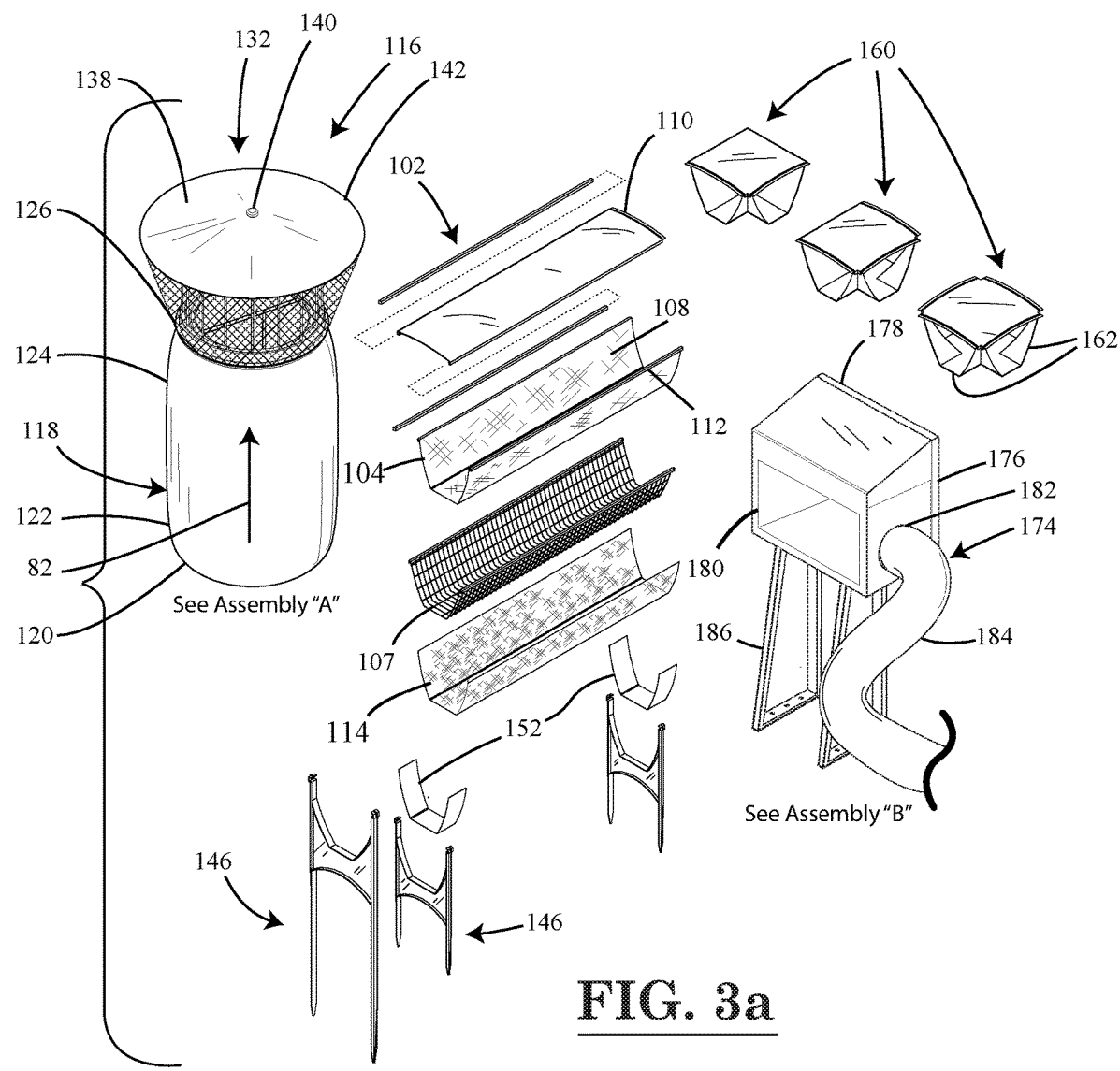
FIG. 3a is a disassembled view of the elements of the version shown in FIG. 1.

Further, as best illustrated by FIG. 3a, the habitat kit 100 may further include one or more connection modules 160 for connecting two or more tubular passageway modules 102, providing a continuous pathway 80 from one module to another. Ideally, the connection modules 160 may comprise two or more ports 162 which may be relatively positioned to provide linear, angled, or perpendicular pathways 80 between two or more modules 102.

Figure 10:
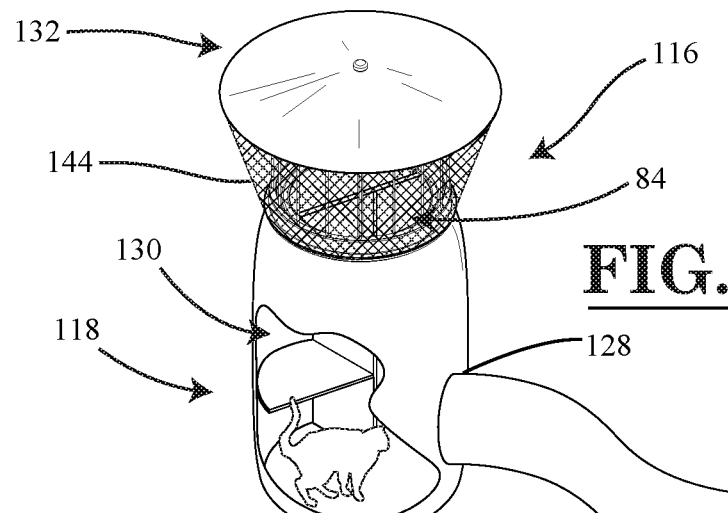
FIG. 10 is a cut-away view of an example destination module of the version shown in FIG. 1.

In certain versions of the application as best illustrated by FIG. 10, the habitat kit 100 may further include one or more destination modules 116 for providing an enclosed vertical pathway 82 leading to an elevated cat vantage point 84. The destination modules 116 generally comprise a base container 118 and an overlook assembly 132.

Figure 3B:
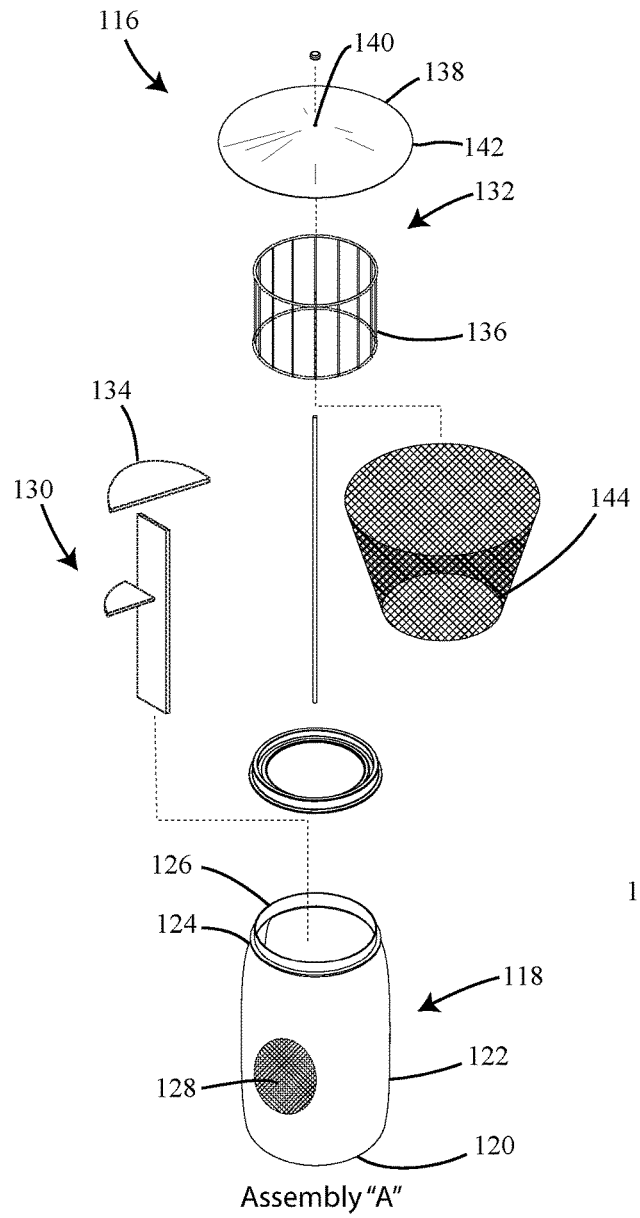
FIG. 3b is an exploded view of the destination module of the version in FIG. 1.

In the illustrated version and as best shown in FIG. 3a, FIG. 3b, and FIG. 10, the destination module 116 generally includes a base container 118 having a floor 120, an upward extending sidewall 122, and open top 124 defined by a perimeter 126. The sidewall 122 having at least one access port 128 configured to couple with at least one tubular passageway module 102. Preferably, the destination module 116 is in the shape of a barrel having a radial sidewall 122; however, other shapes such as a box can be envisioned. Ideally, the base container 118 interior further includes a plurality of staggered platforms 130 succeeding in height—the staggered platforms 130 imitating the staggering branches of a tree for intriguing the instincts of the cat during a vertical climb (vertical pathway 82) or can also provide area for rest.

At the top of the destination module 116 is an overlook assembly 132 for providing an elevated cat vantage point 84 of the exterior environment. The overlook assembly 132 is operably positioned atop and sealing about the open top 124 perimeter 126 forming the destination module 116.

In the illustrated version, the overlook assembly 132 generally has a partial floor 134 providing vertical access to the base container 118, an open-air barrier wall or transparent radial side wall 136 extending upward and about the perimeter of the overlook assembly 132, and a contoured roof 138 operably and centrally positioned atop the sidewall 136 forming the interior space. The transparent radial side wall 136 may be made of any material that provides an unobstructed view of the surrounding exterior environment such as plastic, glass, or composite material. Preferably, the roof 138 is contoured in the form of a cone having a peak 140 extending downward and terminating at an outer radial perimeter 142—thereby preventing rain and other elements from entering the destination module 116.

Preferably, as illustrated in FIG. 3b and FIG. 10, a mosquito-proof screening 144 provides a barrier about the overlook assembly 132, thereby sealing and shielding the interior space of the destination module 116 from exterior insects and most importantly, the cat.

In certain versions of the application, the height of the base container 118 is greater than the length of the tubular passageway modules 102, wherein the plurality of tubular passageway modules 102 along with other modules will fit longitudinally in the base container for storage and transport purposes.

Figure 12:
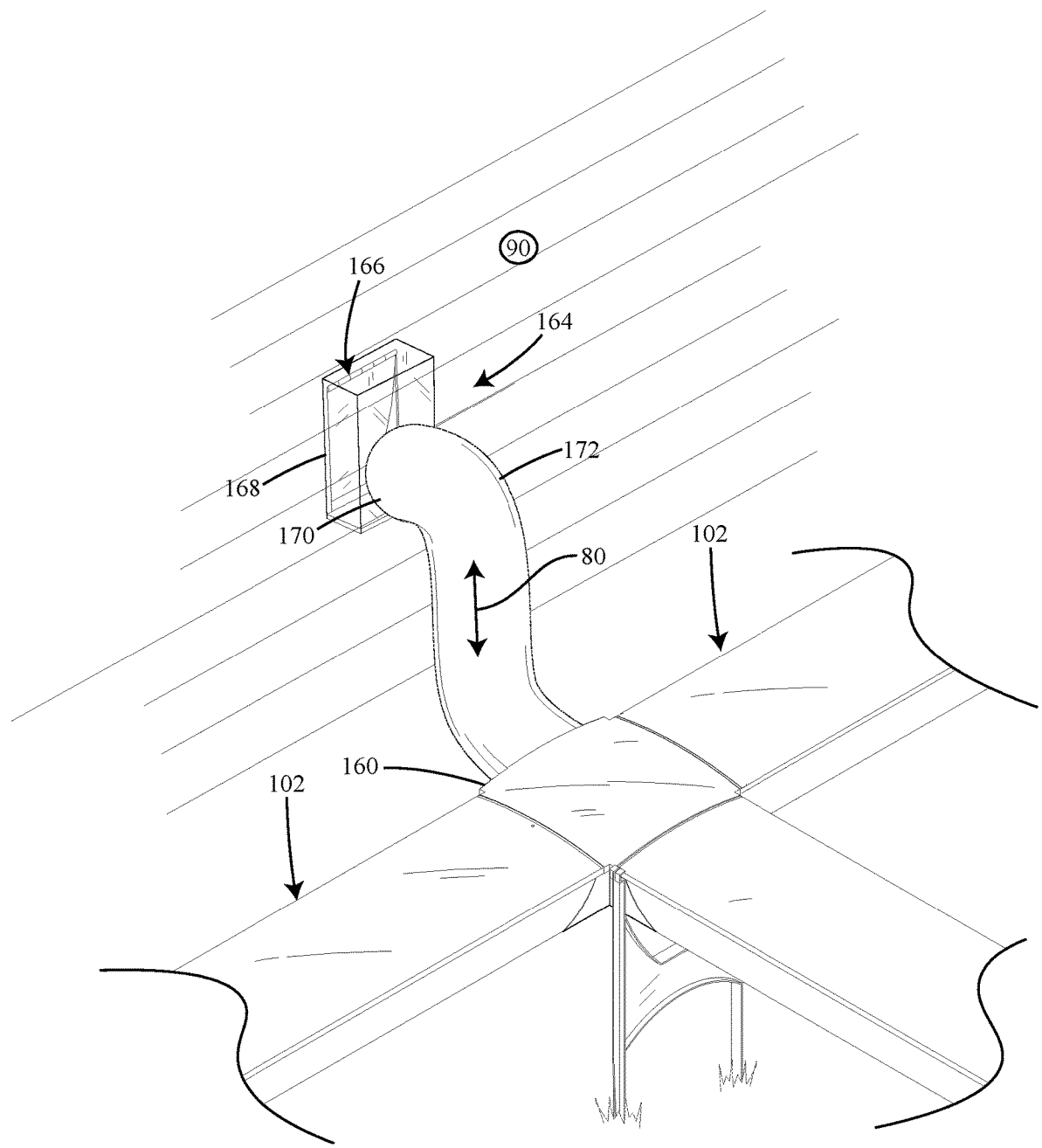
FIG. 12 is an illustrative view showing an example pet door module.
Figure 13:
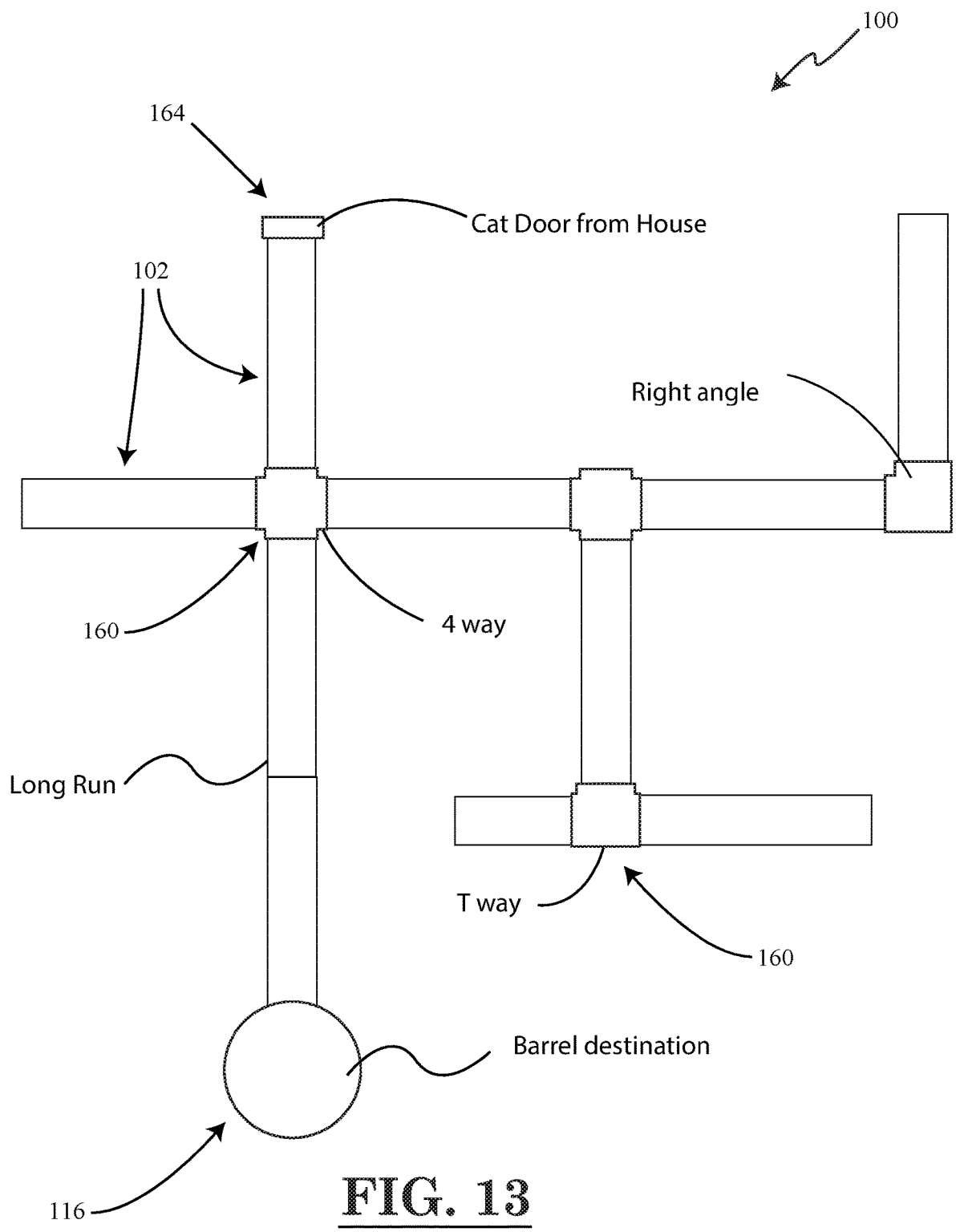
FIG. 13 is a plan diagram view of an example of a cat habitat overall layout.

Now referring to FIG. 12, the cat habitat kit 100 may further include a pet door access module 164 for ingress and egress to the interior of the house through an exterior wall 90. In a version of the application, the pet door access module 164 generally comprises an enclosed hinged door 166 operably positioned within the pet door access module 164, an exterior container 168 for enclosing the enclosed hinged door 166 having at least one port 170, and a flexible connection tube 172 for connecting and providing a pathway 80 between the exterior container 168 port 170 and a connection module 160 or a tubular passageway module 102.

Figure 3C:
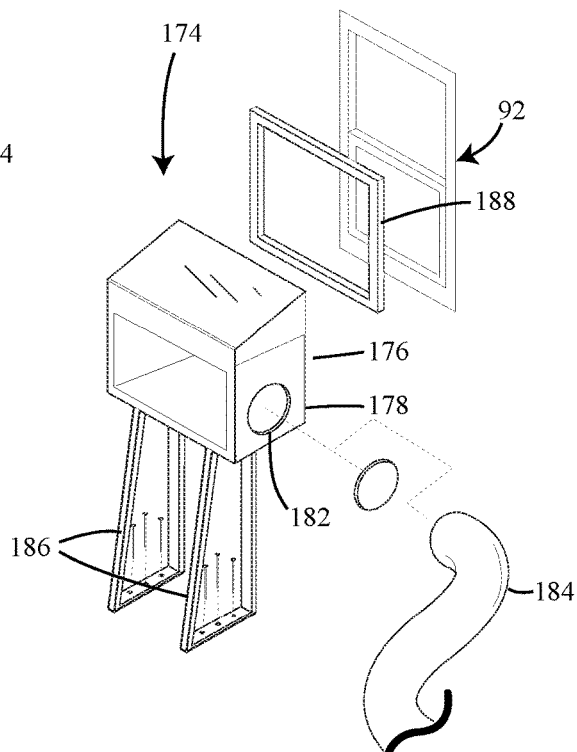
FIG. 3c is an exploded view of the window access module of the version in FIG. 1.

Similarly, as best illustrated by FIG. 3c, the habitat kit 100 may further comprise a window access module 174 for ingress and egress to the interior of the house through an existing window structure. In the illustrated version, the window access module 174 generally comprises an exterior container 176 substantially shaped and sized to correspond and attached with the exterior of a window opening, the exterior container 176 having an open back 178, an optional window 180, and at least one port 182, and a flexible connection tube 184 for connecting and providing a pathway 80 between the port 182 and a connection module 160 or a tubular passageway module 102.

Figure 1:
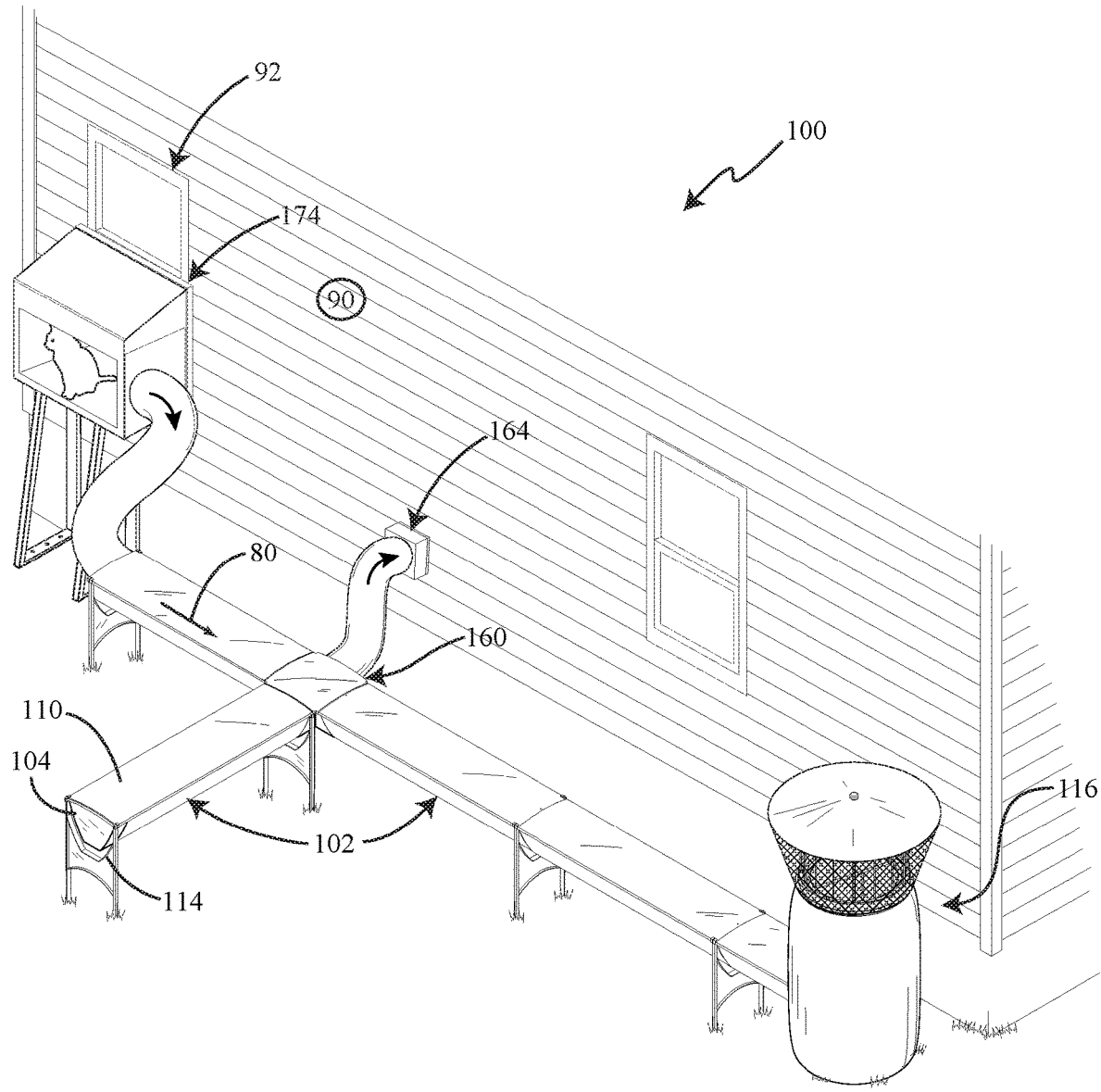
FIG. 1 is an illustrative view of a version of the application.
Figure 2:
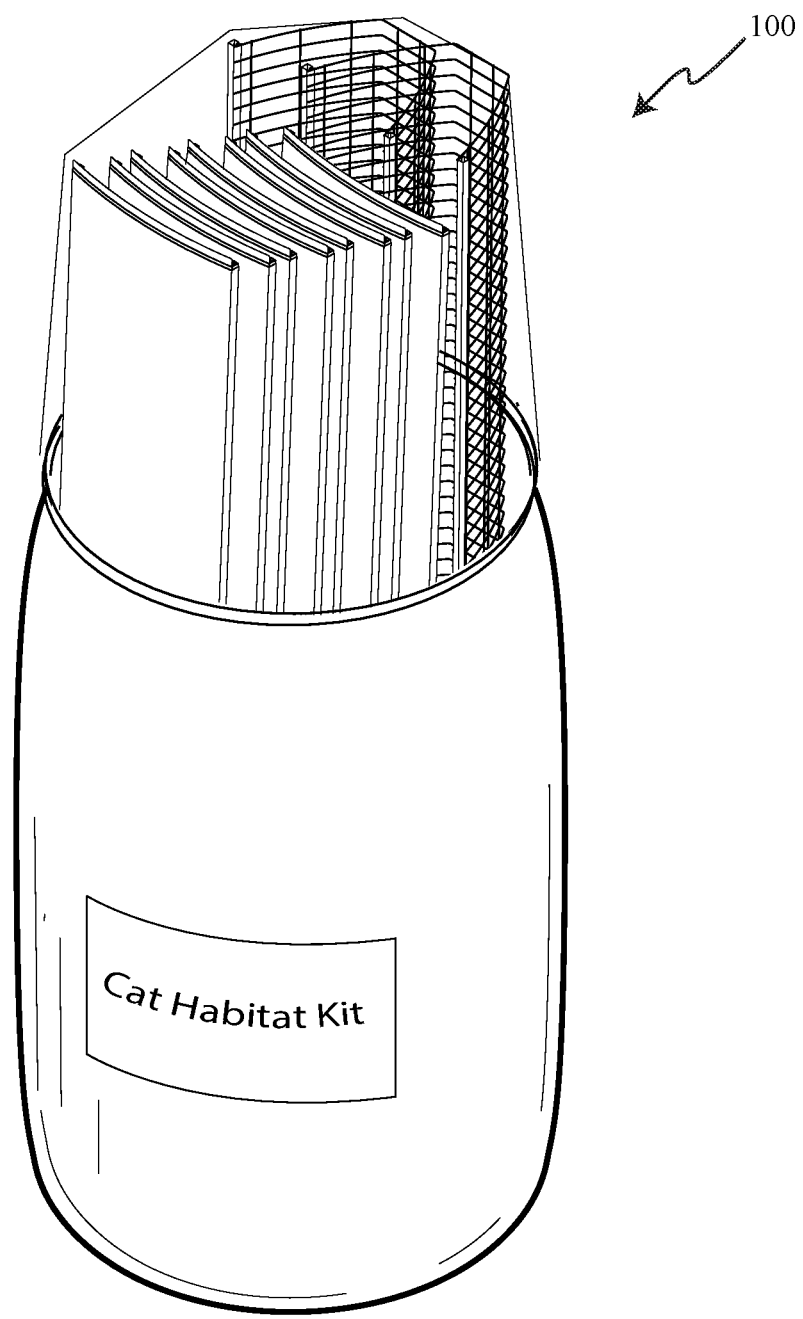
FIG. 2 is an illustrative view of a kit of the version shown in FIG. 1.

In a version of the application, the window access module 174 may further comprise one or more ground supports 186 for supporting the exterior container 176 above the ground and at a sufficient height adjacent the window opening (See FIG. 1, FIG. 3a, and FIG. 3c). Moreover, a seal 188 is provided which is operably positioned between the window opening and the open back of the exterior container in order to seal the exterior container 176 to the window 92 as illustrated in FIG. 3c.

Figure 11:
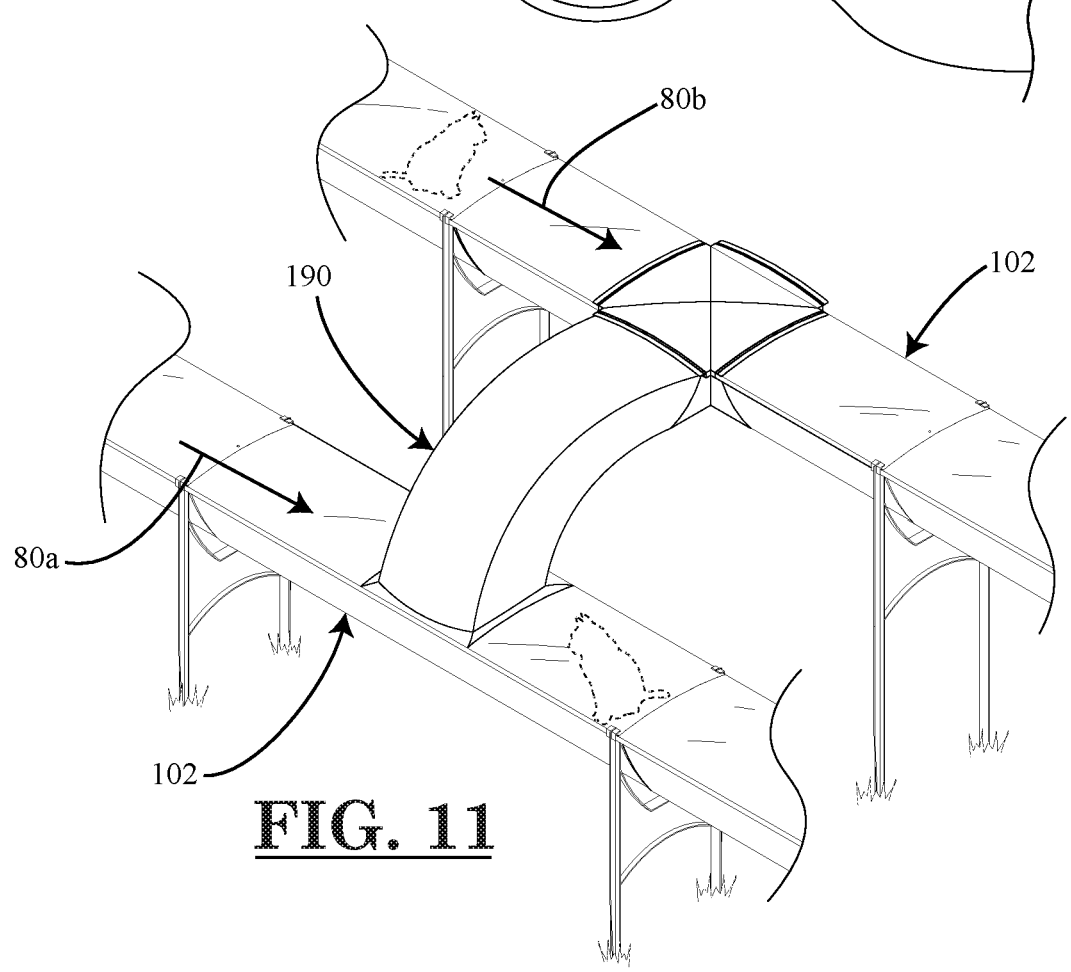
FIG. 11 is a perspective view showing a lateral pathway connector connecting pathways.

Lastly, and optionally, as illustrated in FIG. 11, a lateral pathway connector 190 may be provided. The lateral pathway connector 190 is configured to operably connect two or more lateral pathways 80a, 80b formed by different sets of tubular passageway modules 102 as illustrated. The lateral pathway connector 190 may be a flexible connection tube.

Figure 14:
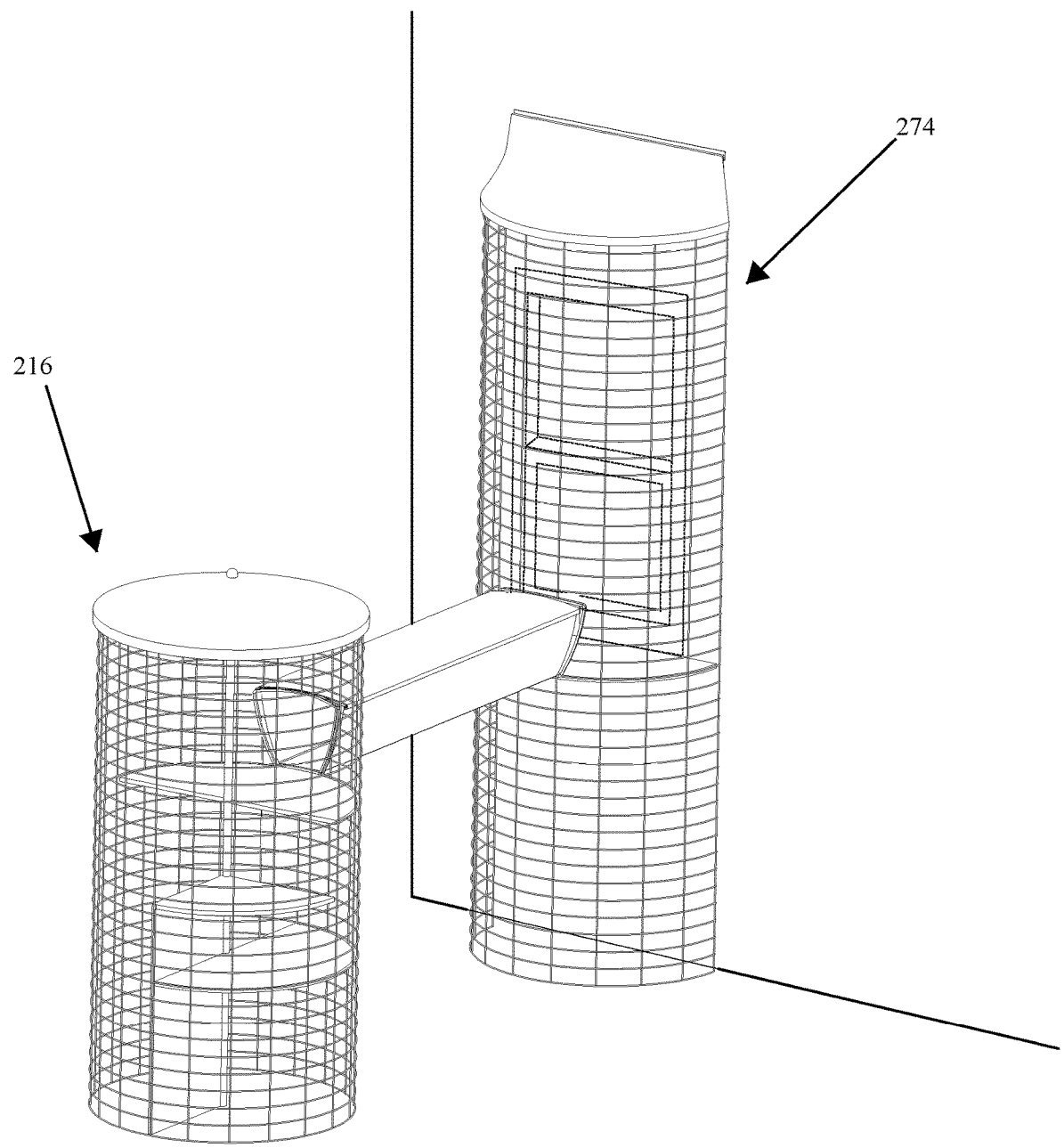
FIG. 14 is a second embodiment of a window access module and a second embodiment of a destination module.

FIG. 14 is a second embodiment of a window access module 274 and a second embodiment of a destination module 216.

The habitat kit 100 can be made in any manner and of any material chosen with sound engineering judgment. Preferably, materials will be strong, lightweight, long lasting, economic, ergonomic, and eco-friendly.

The invention does not require that all the advantageous features and all the advantages need to be incorporated into every version of the invention.

Although preferred embodiments of the invention have been described in considerable detail, other versions and embodiments of the invention are certainly possible. Therefore, the present invention should not be limited to the described embodiments herein.

All features disclosed in this specification including any claims, abstract, and drawings may be replaced by alternative features serving the same, equivalent or similar purpose unless expressly stated otherwise.

What is claimed is:

1. A kit for assembly of a cat habitat, the cat habitat configured to provide one or more interlinking cat navigable pathways, the kit comprising:
   a) a plurality of tubular passageway modules for providing a segment of the cat navigable pathway, each tubular passageway module comprising:
      i) a cat walkway having a bottom surface with upward extending sidewalls terminating at opposing longitudinal upper perimeters and extending the length of the module;
      ii) a roof extending the length of the module and attachably coupled to and between the opposing longitudinal upper perimeters of the upward extending sidewalls in order to fully enclose the cat navigable pathway; and
      iii) a mosquito screening extending exterior of the cat walkway providing a barrier along the length of the tubular passageway module, thereby sealing and shielding the pathway from exterior insects;
   b) a destination module for providing an enclosed vertical pathway leading to an elevated vantage point, the destination module comprising:
      i) a base container having a floor, an upward extending sidewall having at least one access port configured to couple with the at least one tubular passageway module, the base container having a plurality of staggered platforms ensuing in height; and
      ii) an overlook assembly for providing an elevated vantage point of exterior environment operably positioned atop and communicating with the base container forming the destination module, the overlook assembly having a partial floor providing vertical access to the base container, an open-air barrier wall extending upward and about the floor, and a roof operably positioned atop the open-air barrier wall forming an interior space and preventing rain and other elements from entering the destination module.

2. The kit for assembly of a cat habitat of claim 1, further comprising a second mosquito screening providing a barrier about the overlook assembly, thereby sealing and shielding the interior space of the destination module from exterior.

3. The kit for assembly of a cat habitat of claim 1, further comprising one or more yard supports for supporting one or more tubular passageway modules at a desired height, the yard supports comprising:
   a) opposing legs adapted to insert with a ground surface;
   b) a central support structure connecting the opposing legs and operably shaped in conjunction with the opposing legs to receive and cradle cross-section of the one or more tubular passageways;
   c) each leg extending upward and terminating at an attachment socket having inwardly exposed channels, each channel configured to couple with and contain the opposing longitudinal upper perimeters of the cat walkway and the roof, thereby providing a tight unitary constructive fit.

4. The kit for assembly of a cat habitat of claim 1, further comprising a pet door access module for ingress and egress to the interior of the house through an exterior wall, the pet door access module comprising:
   a) an enclosed hinged door operably positioned exterior of the exterior wall;
   b) an exterior container for enclosing the hinged door having at least one port; and c) a flexible connection tube for connecting and providing a pathway between the exterior container port and a connection module or a tubular passageway module.

5. The kit for assembly of a cat habitat of claim 1, further comprising a window access module for ingress and egress to the interior of the house through an existing window structure, the window access module comprising:
   a) an exterior container substantially shaped and sized to correspond with exterior of a window opening, the container comprising an open back, a window, and at least one port; and
   b) a flexible connection tube for connecting and providing a pathway between the port and a connection module or a tubular passageway.

6. A kit for assembly of a cat habitat, the cat habitat configured to provide one or more interlinking cat navigable pathways, the kit comprising:
   a) a plurality of tubular passageway modules for providing a segment of the cat navigable pathway, each tubular passageway module comprising:
      i) a cat walkway having a bottom surface with upward extending sides terminating at opposing upper longitudinal perimeters and extending the length of the tubular passageway module, wherein the cat walkway is at least partially manufactured of wire mesh exposing the cat navigable pathway to outside airflow;
      ii) a roof extending the length of the module and attachably coupled to and between the opposing upper longitudinal perimeters of the upward extending sidewalls in order to fully enclose the cat navigable pathway; and
      iii) a mosquito screening extending between the opposing longitudinal upper perimeters and exterior of the cat walkway providing a barrier along the length of the tubular passageway module, thereby sealing and shielding the pathway from exterior insects; wherein the mosquito screening is disposed at least a distance from the cat walkway to form a neutral zone therebetween to prevent the cat from damaging the mosquito screening; and
   b) a destination module for providing an enclosed vertical pathway leading to an elevated vantage point, the destination module comprising:
      i) a base container having at least one access port configured to couple with the at least one tubular passageway module;
      ii) an overlook assembly for providing an elevated vantage point of exterior environment operably positioned atop and communicating with the base container forming the destination module.

7. The kit for assembly of a cat habitat of claim 6, wherein the distance to form a neutral zone is between 0.5 and 1.5 inches.

8. The kit for assembly of a cat habitat of claim 6, further comprising an exterior open-air safety barrier having opposing upper longitudinal perimeters coinciding with the opposing longitudinal upper perimeters of the cat walkway.

9. The kit for assembly of a cat habitat of claim 6, wherein the height of the base container is greater than the length of a tubular passageway module, wherein the plurality of tubular passageway modules will fit longitudinally in the base container for storage purposes.

10. A kit for assembly of a cat habitat, the cat habitat configured to provide one or more interlinking cat navigable pathways, the kit comprising:
    a) a plurality of tubular passageway modules for providing a segment of the cat navigable pathway, each tubular passageway module comprising:
       i) a cat walkway having a bottom surface with upward extending open-air sidewalls terminating at opposing upper longitudinal perimeters and extending the length of the module;
       ii) a roof extending the length of the module and attachably coupled to and between the opposing longitudinal upper perimeters of the upward extending open-air side in order to fully enclose the cat navigable pathway, the roof having opposing longitudinal side perimeters;
       iii) an exterior open-air safety barrier having opposing upper longitudinal perimeters coinciding with the opposing upper longitudinal perimeters of the cat walkway, wherein the exterior open-air safety barrier is positioned exterior of the cat walkway forming a neutral zone therebetween.

11. The kit for assembly of a cat habitat of claim 10, further comprising a destination module for providing an enclosed vertical pathway leading to an elevated vantage point.

12. The kit for assembly of a cat habitat of claim 11, wherein the destination module further comprises a base container having at least one access port configured to couple with the at least one tubular passageway module; and an overlook assembly for providing an elevated vantage point of the exterior environment operably positioned atop and communicating with the base container forming the destination module.

13. The kit for assembly of a cat habitat of claim 12, wherein the height of the base container is greater than the length of a tubular passageway module, wherein the plurality of tubular passageway modules will fit longitudinally in the base container for storage purposes.

14. The kit for assembly of a cat habitat of claim 10, further comprising a mosquito screening coupled adjacent with the exterior open-air safety barrier for shielding the pathway from exterior insects.

15. The kit for assembly of a cat habitat of claim 10, wherein each tubular passageway module further comprises opposing linear channels longitudinally disposed at the opposing upper longitudinal perimeters of the cat walkway; and the kit further comprising a plurality of paired linear connection rods fitted for insertion into the reciprocal linear channels of two or more passageway modules.

16. The kit for assembly of a cat habitat of claim 10, wherein the opposing side longitudinal perimeters of the roof, the opposing upper longitudinal perimeters of the cat walkway, and the opposing upper longitudinal perimeters of the exterior open-air safety barrier collectively form integral opposing linear channels extending the length of the tubular passageway module; and the kit further comprising a plurality of paired linear connection rods fitted for insertion into the reciprocal linear channels of two or more passageway modules providing an established compression fit.

* * * * *